United States Patent Office 3,423,466
Patented Jan. 21, 1969

3,423,466
PROCESS FOR THE PRODUCTION OF BENZALDEHYDE
August Guyer, Jr. and Pio Guyer, Zurich, and Günther Gut, Zug, Switzerland, assignors to August Guyer, Zurich, Switzerland
No Drawing. Filed Sept. 10, 1964, Ser. No. 395,604
Claims priority, application Switzerland, Sept. 23, 1963, 11,679/63
U.S. Cl. 260—599  7 Claims
Int. Cl. C07c 47/54

ABSTRACT OF THE DISCLOSURE

A process for the production of benzaldehyde by the catalytic oxidation of toluene in gaseous phase with an oxygen-containing gas which contains a maximum of 15% by volume of oxygen. The process is run under elevated pressure and at a linear velocity of at least 60 meters per minute over the catalyst. The catalyst is a highly active solid oxidation catalyst, preferably a uranium oxide, a vanadium oxide, or a molybdenum oxide.

---

The present invention has reference to an improved process for the production of benzaldehyde.

It is known that benzaldehyde is formed by passing toluene in gaseous form together with air over catalysts at temperatures between 300° C. and 500° C. (cf. among others Ullmann's Enzyklopädie der Technischen Chemie, (1953) 3rd Edition, 4th volume, page 238). Various oxides of the V and VI Group of the periodic system are known as catalysts, whereby especially with highly active vanadium pentoxide only very poor yields can be obtained in that a large portion of the toluene is subject to a complete oxidation forming carbon dioxide. Furthermore, it is known that by using a recycle gas stream and simultaneously replacing the used oxygen, improved yields can be obtained; they may amount to 30% to 50%. However, a problem encountered in this operation is the separation of the resulting benzaldehyde.

Since the desired oxidation reaction occurs without decrease of the volume and since it is further known that oxidation reactions are much more vigorous under pressure, it was to be expected that the application of pressure for the desired course of recation would only have unfavorable effects.

Surprisingly, it has now been found that it is possible to more selectively effect the oxidation of toluene to benzaldehyde by employing an oxidation gas having an oxygen content lower than air, for example 3% to 15% by volume, preferably 6% to 10% by volume, and by conducting a mixture of toluene and said oxidation gas at a linear velocity of at least 60 meters per minute and up to about 600 meters per minute over a highly active solid oxidation catalyst, for instance vanadium oxide catalysts, if the reaction mixture is under elevated pressure, for example an absolute pressure in atmospheres of 3 to 20, preferably 6 to 8. It does not make any difference if fresh gas or recycling gas is employed. It has been found that by application of such elevated pressures and at the same reaction rate a reaction temperature can be maintained which is lower by 20° C. to 40° C. Furthermore, it was found that due to the selection of these working conditions, in consequence of the improved heat conductivity of the denser gases, overheating effects upon the individual solid contact particles may be considerably minimized or suppressed so that the progress of the oxidation to higher levels of oxidation, and in particular the total combustion to carbon dioxide, may be suppressed, thereby providing increased yields of benzaldehyde. In addition to vanadium oxides as catalysts, uranium oxides and molybdenum oxides can also be employed. Such oxidation catalysts can preferably be applied to a carrier such as silicon oxides or aluminum oxides for instance.

The inventive process furthermore provides the additional advantage that the benzaldehyde thus formed may be separated from the reaction gas leaving the reactor in a much simpler and more quantitative manner.

If the operation is effected under elevated pressure and by recycling there may be undertaken a fractionated condensation, and this fractionated condensation can be controlled such that the benzaldehyde is separated from the gas and, at the same time, from the major portion of the toluene in the recycle operation. In so doing, the benzaldehyde is obtained, together with any acids formed as by-products, in the form of a highly concentrated toluene solution from which the benzaldehyde can easily be isolated in a pure form.

An additional advantage of oxidation under pressure resides in the fact that the separation of the portion of toluene remaining in the off gas stream together with any remaining traces of benzaldehyde is effected by cooling before its de-compression or expansion, thus yielding a liquid product which may directly be recycled into the process.

Accordingly, it is a primary object of the present invention to provide an improved process for the production of benzaldehyde which is economical and highly efficient.

A further important object of the present invention resides in the provision of an improved process for the production of benzaldehyde resulting in a greater yield of benzaldehyde from toluene.

Another important object of the present invention concerns itself with an improved process for the production of benzaldehyde which facilitates the separation of the formed benzaldehyde from the other components and the starting components.

Still another noteworthy object of the present invention is the production of benzaldehyde in an economical and efficient manner with the formation of less side products.

The present invention is further illustrated by the following examples:

EXAMPLE 1

A gaseous mixture of toluene and oxygen-containing gas (oxidation gas) which contains 200 grams toluene per normal cubic meter of gas (0° C., 760 millimeters pressure) was conducted at a pressure of 6 atmospheres absolute with a linear velocity of at least 60 meters per minute over a vanadium pentoxide oxidation catalyst. The oxidation gas contained 8% by volume oxygen and the catalyst was maintained at a temperature of 380° C. The gases leaving the reactor were cooled in a heat exchanger to 80° C. to 85° C. and subsequently introduced into a fractionating column. The condenser arranged at the top of the column was operated at a temperature of 60° C. and the condensated mixture was introduced into the column as reflux. The reaction gas emanating from the column was practically free of benzaldehyde and contained non-reacted toluene and water of reaction as the condensable components. The crude benzaldehyde thus obtained had the following composition: 49% by weight benzaldehyde, 8% by weight benzoic acid and maleic acid, 42% by weight toluene, 1% by weight higher boiling products. 5% by volume of the recycle or circulating gas was removed after separation of the condensable components and replaced by fresh gas in order to keep the oxygen concentration in the recycling gas and the pressure in the apparatus at constant values. 3% by weight toluene was converted to oxidation products per pass, whereby 77% by weight of the reacted toluene was obtained as benzaldehyde, 11% by weight as acids, and 12% by weight as carbon dioxide and side products.

EXAMPLE 2

In the same manner as in Example 1 a reaction mixture containing 250 grams toluene per normal cubic meter of gas was conducted at a linear velocity of at least 60 meters per minute over a vanadium pentoxide catalyst. The oxygen content of the oxidation gas was 12% by volume and the reaction temperature 370° C. 20% by volume of the recycling gas was replaced by fresh air. 8% by weight toluene was converted per pass. The product mixture thus obtained contained 220 grams benzaldehyde per liter and the benzaldehyde yield, based upon the toluene converted, amounted to 64% by weight.

The foregoing detailed description has been given for clearness of understanding only, and no unnecessary limitations should be understood therefrom, as modifications will be obvious to those skilled in the art.

What is claimed is:

1. Process for the production of benzaldehyde by catalytic oxidation of toluene in gaseous phase with an oxygen-containing gas and in the presence of a highly active solid oxidation catalyst comprising the steps of: conducting the toluene with the oxidation gas, with said oxidation gas containing a maximum of 15% by volume oxygen, under elevated pressure and at a linear velocity of at least 60 meters per minute over the catalyst, and effecting the separation of the thus formed benzaldehyde also under pressure, wherein the said oxidation is conducted at elevated temperatures and the said oxidation and subsequent separation of benzaldehyde is effected at an absolute pressure in atmospheres of 3 to 20.

2. Process for the production of benzaldehyde according to claim 1 wherein the oxidation and separation of the benzaldehyde is preferably effected at an absolute pressure in atmospheres of 6 to 8.

3. Process for the production of benzaldehyde according to claim 1 wherein the oxygen content of the oxidation gas is 3%–15% by volume.

4. Process for the production of benzaldehyde according to claim 1 wherein the oxygen content of the oxidation gas is preferably 6% to 10% by volume.

5. Process for the production of benzaldehyde according to claim 3 wherein the gas residue remaining after separation of the benzaldehyde together with the nonreacted toluene is recycled without decompression.

6. Process for the production of benzaldehyde according to claim 5 wherein the formed benzaldehyde is removed from the recycle gas by means of condensation in a fractionating column at such a high temperature that there is obtained a concentrated solution of benzaldehyde in toluene.

7. Process for the production of benzaldehyde according to claim 1 wherein the catalyst is selected from the group consisting of vanadium oxides, uranium oxides and molybdenum oxides.

References Cited

UNITED STATES PATENTS 2,199,585   5/1940   Bone et al. _____ 260—599

BERNARD HELFIN, *Primary Examiner.*